US00H002201H

(19) United States

(12) Statutory Invention Registration (10) Reg. No.: US H2201 H

Stytz et al. (43) Published: Sep. 4, 2007

(54) SOFTWARE ARCHITECTURE AND DESIGN FOR FACILITATING PROTOTYPING IN DISTRIBUTED VIRTUAL ENVIRONMENTS

(75) Inventors: Martin R. Stytz, Beavercreek, OH (US); Sheila B. Banks, Oviedo, FL (US)

(73) Assignee: The United States of America as represented by the Secretary of the Air Force, Washington, DC (US)

(21) Appl. No.: 10/094,738

(22) Filed: Mar. 11, 2002

Related U.S. Application Data

(60) Provisional application No. 60/276,569, filed on Mar. 19, 2001.

(51) Int. Cl.
*G06F 9/44* (2006.01)

(52) U.S. Cl. ..... 717/104

(58) Field of Classification Search ..... 715/503; 709/203, 231; 707/100; 705/1
See application file for complete search history.

(56) References Cited

U.S. PATENT DOCUMENTS

| | | | | | |
|---|---|---|---|---|---|
| 6,157,935 | A | * | 12/2000 | Tran et al. | 715/503 |
| 6,356,946 | B1 | * | 3/2002 | Clegg et al. | 709/231 |
| 6,424,991 | B1 | * | 7/2002 | Gish | 709/203 |
| 2002/0156792 | A1 | * | 10/2002 | Gombocz et al. | 707/100 |
| 2002/0165727 | A1 | * | 11/2002 | Greene et al. | 705/1 |

* cited by examiner

*Primary Examiner*—Dan Pihulic

(74) *Attorney, Agent, or Firm*—AFMCLO/JAZ; Gina S. Tollefson

(57) ABSTRACT

The invention is a data-handling architecture that exploits the technical advantages offered by object-oriented techniques, classes, data containers, component software, object frameworks, containerization, design patterns, and a central runtime data repository. The architecture is based on the Common Object DataBase (CODB), frameworks, components, objects, information streams, and containers. The software exploits the Extensible Markup Language (XML), employs software gauges, and uses intelligent agents to aid in assembly, diagnosis, evaluation, composition, and re-configuration of a DATE-based application. The architecture of the present invention is defined by highly-modular components where interdependencies are well-defined and minimized. Components define the major aspects of the inventive architecture, objects are used to flesh out the specification, design, and implementation of the components. The invention's architecture can support the dynamic loading of any of the components or major objects in any component required without re-linking or recompiling software. Within the architecture, data is transmitted between components only along information streams within containers using the Extensible Markup Language (XML).

20 Claims, 5 Drawing Sheets

A statutory invention registration is not a patent. It has the defensive attributes of a patent but does not have the enforceable attributes of a patent. No article or advertisement or the like may use the term patent, or any term suggestive of a patent, when referring to a statutory invention registration. For more specific information on the rights associated with a statutory invention registration see 35 U.S.C. 157.

SOFTWARE ARCHITECTURE AND DESIGN FOR FACILITATING PROTOTYPING IN DISTRIBUTED VIRTUAL ENVIRONMENTS

CROSS REFERENCE TO RELATED APPLICATION

This application claims priority of the filing date of Provisional Application Ser. No. 60/276,569, filed Mar. 19, 2001, the entire contents of which are incorporated herein by reference.

GOVERNMENT INTEREST

The invention described herein may be manufactured, used, sold, imported, and/or licensed by or for the Government of the United States of America without the paymant to us of any royalties thereon.

FIELD OF INTEREST

The present invention relates to a software architecture and design for enhancing rapid prototyping in distributed virtual environments such as in aircrew training systems, various simulators, database systems, video gaming systems, network management software, commercial accounting software, wireless web software applications, or communications systems.

BACKGROUND OF THE INVENTION

The run-time challenges for computer-generated actors (CGAs) lie in computing human-like behaviors and reactions to a complex dynamic environment at a human-scale rate of time. (A computer-generated actor is an entity whose intelligence is computer-based. Its decisions are made using one or a number of artificial intelligence decision-making techniques that operate upon one or more knowledge bases. A computer-generated actor's observable behaviors are based on the outputs of the decision mechanisms and are moderated by one or more human behavior models.) Additionally, the CGA behavior must be realistic and accurate enough so that other CGAs and human participants react to its outputs as though it were human-controlled. Therefore, the capability to construct large, complex reasoning systems and the development of comprehensive knowledge bases for use by the decision machinery are needed to enable the implementation of CGAs of acceptable fidelity. A large body of work has been developed that addresses these and other issues that must be addressed when assembling a CGA. To date, many aspects of the process of defining a CGA, its behavior, architecture, and reasoning sysetms have been reported. Unfortunately, no consensus has emerged concerning the best means to accomplish these tasks and the literature provides minimal insight into the difficulties involved and approaches that have demonstrated potential or proven useful. Surprisingly, the requirements for CGAs have been addressed infrequently in the literature, but this may be because general-purpose requirements are difficult to enumerate at this stage of the development of the field. Lessons learned and system specifications have also been discussed sparingly. As might be expected for a software system, architectural aspects for the CGA have been addressed often and report the use of a wide variety of approaches. The architectural approaches range from modular software libraries and interacting processes to closely coupled objects and data-flow architectures. The crucial aspect of any CGA, as has been proved in many demonstrations, is the effectiveness of its reasoning mechanism. The reasoning mechanism should offer acceptable performance coupled with robustness and suitability to the problem domain. A wide variety of reasoning systems have been proposed, but to date no consensus has been reached. Results to date indicate that the problem domain and operational environment more than any other factors determine the suitability of a reasoning system. However, no guidelines have been proposed that would allow a system developer to choose a reasoning mechanism based upon a characterization of the problem domain or operational environment.

Associated with the issue of choice of reasoning system are the issues of knowledge acquisition and representation. Behavior modeling is also an important issue. In these areas, as in the case of reasoning mechanisms, no consensus has been developed regarding solutions to the issues that are involved, but this may be due to the application-specific solutions proposed in many papers and the stringent demands of the problem domains that were investigated. A number of researchers have addressed issues related to threat system generation. A related issue is the modeling of the military command and control processes that the CGAs must operate within. Here again, a wide variety of approaches have been examined for architectures, approaches, reasoning systems, models of military hierarchy, order generation and dissemination, intelligence gathering, and command and control. However, no consensus has emerged. Planning and inter-CGA coordination are important issues for CGAs, unfortunately little work that has been reported. As in most areas of CGA technology, no consensus has emerged and there is clearly no superior approach.

In general, software architectures have witnessed a gradual evolution over the paste eight years from a state where the software architecture is closely tied to the reasoning system to a state where the architecture is designed independently of the supported reasoning system(s). Most system rely on the programmer to be very familiar with the system, design, and implementation in order to make changes to the implementation, in general most systems also seem to have very high coupling and a very low degree of information hiding. However, there does seem to be a move toward systems with greater encapsulation of functionality/objects and amore component-based approach. The most popular current architectural approach is the use of software modules as the foundation for the architecture. Object-oriented inheritance, when used, seems to be favored as an approach; however, the inheritance trees are permitted to grow without bound, which tends to limit the utility and effectiveness of inheritance. Most authors do not discuss their approach to the decomposition or architectural definition task, when the topics are discussed the most favored approach seems to be one centered around a functional decomposition. Software agents continue to gain in popularity as an architectural solution, no doubt in the hope that their use will help to control the complexity of the overall system. Software layering, sometimes used in conjunction with object-orientation or components, has been used by a few systems to help control the complexity of the software. However, some of the resulting systems nevertheless have complex architectures. In general, systems still have a connection between the architecture and supported reasoning system and only a few CGA applications are capable of supporting more than one reasoning system. Additionally, the question of which architectural approach(es) best suit the CGA domain remains an open problem.

Accordingly, those skilled in the art will readily recognize there is a need to provide a system architectural definition, to minimize software development cost, to minimize data transport cost and to minimize software maintenance cost at the architectural and design level for CGA applications. The present invention addresses this need.

SUMMARY OF THE INVENTION

Accordingly, an object of the present invention is to minimize software development cost, data transport cost and software maintenance cost at the architectural and design level.

Another object of the present invention is to present a solution to these issues at the architectural and design level in a readily available and well-known format.

These and other objects of the present invention are achieved by a data-handling, software architecture based on a Common Object DataBase (CODB), frameworks, components, objects, information streams, and containers. The architecture is based on and includes object-oriented techniques, classes, data containers, component software, object frameworks, containerization, design patterns, and a central runtime data repository. The present invention uses the Extensible Markup Language (XML) within the present invention for data transmission and for data storage. The present invention achieves the above objects by combining software agents, containers, pallets, slots, and information streams to route and transform data as it moves between the components and objects of a software system on a single host or across the network within a distributed computing system. The invention uses XML to store information in knowledge bases and to transmit information between the system components. The invention also uses software gauges to enable the rapid determination of the accuracy and efficacy of the system, to determine if the performance requirements are met, and to aid in system composition and assembly. The invention enables the incremental growth of the system and incremental growth of knowledge bases. The invention also enables the use of human behavior models to moderate and guide decision making.

The invention supports multiple levels of fidelity throughout the system and is compliant with the DoD High Level Architecture. The invention supports distributed multiprocessing and the use of software plug-ins at compile-time and run-time. Further, the invention serves to enable more effective use of rapid software prototyping and thereby reduce development time and cost and make the software development process more responsive to changing requirements.

Essentially, the present invention offers a technique for improvement in component, framework, and object based software development processes and architecture. The invention yields software that has better charactgeristics of information hiding and composability. The invention has lower coupling and lower data transfer costs than software produced using other techniques. The software produced using the invention can be employed within a software architecture that is on a single host or distributed across a network. The invention is an improvement in technology that facilitates rapid prototyping, extreme programming, and geographically distributed software development.

BRIEF DESCRIPTION OF THE DRAWINGS

These and other objects of the invention will become readily apparent in light of the Detailed Description of the Invention and the attached Drawings wherein.

BRIEF DESCRIPTION OF THE APPENDIX

Figure 1:
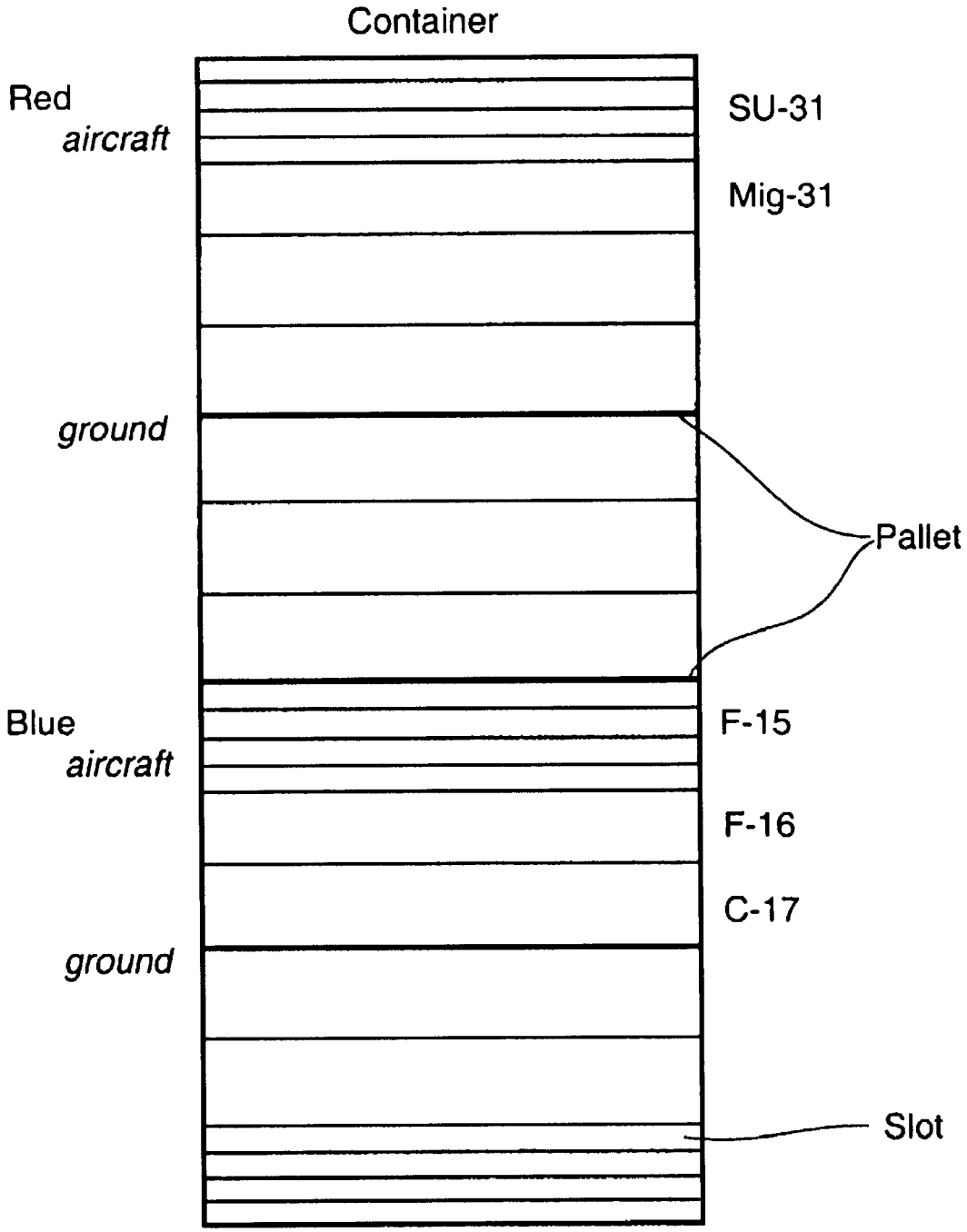
FIG. 1 is an example container in the present invention.

The Appendix comprises a program listing of several examples of the present invention written in XML. The program listing is incorporated herein by reference and is submitted on compact disk.

DETAILED DESCRIPTION OF THE INVENTION

The present invention, for purposes of this detailed description will be referred to as the Dynamic Adaptive Threat Environment (DATE) architecture. (A software architecture describes the parts, data and functions of a system or application, to include the components, objects, composition, control flow(s), data flow(s), interconnections, and functionality of a system.) The present invention permits components and objects to be independently developed and then integrated without disturbing or distressing existing software.

The DATE architecture is a data-handling architecture that exploits the technical advantages offered by object-oriented techniques, classes, data containers, component software, object frameworks, containerization, design patterns, and a central runtime data repository. The architecture is based on the Common Object DataBase (CODB), frameworks, components, objects, information streams, and containers. The software exploits the Extensible Markup Language (XML), employs software gauges, and uses intelligent agents to aid in assembly, diagnosis, evaluation, composition, and re-configuration of a DATE-based application. The DATE architecture is defined by highly-modular components where interdependencies are well-defined and minimized. Components define the major aspects of the DATE architecture, objects are used to flesh out the specification, design, and implementation of the components. The DATE architecture can support the dynamic loading of any of the components or major objects in any component required without re-linking or recompiling software. Within the DATE architecture, data is transmitted between components only along information streams within containers using the Extensible Markup Language (XML). The DATE architecture enables new components and objcets to be added and interchanged in a DATE-based application without disturbing or distressing existing software.

The ability of component software to support composition is based on adherence to predefined constraints and conventions. In DATE, the constraints and conventions specify the functionality that each component brings to the system and the architecture/component interface properties. These properties, constraints, and conventions are captured within the DATE object framework. The DATE frameworks, which are employed at two levels within the DATE architecture, provides the communication and coordination services needed to assemble applications from components and acts as the plumbing that interconnects the components. The DATE framework provides an execution environment for implemented domain components and domain objects and provides services and facilities to support a set of semantic primitives for a group of components. The DATE software framework infrastructure also guarantees message delivery, performs transaction management, and holds software gauges to help assess DATE performance and correctness.

Definitions

Within the DATE architecture, the following terms are defined. An entity is a computer model in use within DATE that can change its state. (In a distributed simulation or other network-based computing environment, changes in state are transmitted between computers according to some network protocol.) An entity can be a computer model of a manned aircraft, a manned armored vehicle, an unmanned combat air vehicle, the weather, solar activity, a command and control network, a computer network, or any other actual or theoretical thing in the real world. An actor is an entity that has intelligence (either computer-based or human-based). An information stream is a logical path through the architecture from an information source to a designated information sink.

A container, as shown in FIG. 1, is a permanent, unvarying software object that consists of a data structure plus software methods for managing that data. Containers are used in information streams. Every container holds data that is exported from an object or from a component within DATE. Containers are structured into pallets and slots. A pallet is a major category of information or data in a container. For example, in a military simulation, there would be pallets defined for Red entities (for entities that belong to enemy forces, e.g. SU-31 and MiG-31), Blue entities (for entities that belong to friendly forces, e.g. F-15, F-16, C-17), Green entities (for entities that belong to neutral forces (not shown), and Yellow entities (for entities that belong to unknown forces (not shown). Pallets within a container can be nested hierarchically. For example, within a Blue forces pallet, additional pallets can be defined for air, ground, sea, and space entities. The data for an individual entity is assigned to a pallet within the container according to the entity's type and within a pallet each entity has its own slot. An entity has only one slot in a container and can be placed into only one pallet. All of the information for an entity needed by any recipient on a given information stream is contained in its slot within a container.

An incoming data stream is data destined for an entity. An outgoing data stream is data that originated at a local entity and is headed for the network environment. Incoming and outgoing are global views. An inbound container is a container that is carrying data into a CODB or entity that the CODB/entity must read. An outbound container is a container that is carrying data away from the CODB or an entity and the CODB/entity must write the container. An inbound container will always be an inbound container, an outbound container will always be an outbound container. Inbound/outbound are information centric views of container operation.

A gauge is software that converts data collected by a software probe into a measure that is meaningful for a particular system for the purpose of performance tuning, information assurance, functional validation, compatibility, or assesment of operational correctness. Gauge outputs are written in XML. A software probe is software that interacts with an operating system, operational application, or subset of an application to collect data for a gauge. Software probe outputs are written in XML.

Architectural Rules

There are six rules for the DATE architecture. The first rule for the DATE architecture is that there are no global variables. The second rule is that only shallow inheritance hierarchies with single inheritance are allowed. The third rule is that each decision engine, sensor or dynamics model can use its own internal coordinate system. The fourth rule is that pointers are to be avoided in the CODB and other major architectural components. However, pointers are permitted on a limited basis within completely encapsulated, non-architectural, non-framework component such as sensor models (pointers may be used within a major architectural system component if this is forced by the operating system, such as when acquiring a block of memory). The fifth rule is that data is not allowed to move between major system components without passing through the CODB via containers along an information stream. Direct communication, or indirect communication using pointers, between major system components is not permitted even when actor or entity migration is being performed. The sixth rule is that the source of data determines the availability of a slot in an outbound container and the source determines which slot in the container holds the data.

Architectural Details

Within the architecture, two levels of frameworks are used to support the system components. One framework is at the highest level of the architecture and the second level framework supports the individual actors or entities in a DATE instantiation. Frameworks are used to knit the DATE components together to form a functioning DATE software application. The highest level framework provides the information routing (hence information stream) and data management services required by the major system components. The second level framwork provides a set of servies that the aspects/components for a given application type require and de-couples the individual components from each other and from the remainder of the system. At the highest level, the DATE architecture frameworks consists of the Common Object Database (CODB), components, containers, and information streams. The architecture is centered on the CODB, which handles data routing and data storage. The CODB functions as the central data repository and information router between all of the DATE components or objects. The CODB also contains intelligent agents that are used to check the accuracy of the connections on the information streams, select software gauges to be enabled for the CODB, evaluate gauge output, initiate and terminate data logging, and to report error conditions (using XML). The CODB contains software gauges to provide data about the information being transmitted, the correctness of the fit of the components, the operation of the system, and other performance and correctness information that would be of use in assembling, debugging, and using the system.

In a DOD High Level Architecture distributed simulation, the CODB insures that all of the informatio publication and subscription requirements in the applicable Federation Object Model (FOM) or Simulation Object Model (SOM) are met as required by the Department of Defense High Level Architecture (HLA) specification. The CODB receives inbound information for all of the data streams that it services, determines the recipients of the data, and stores the information until requested, at which time the information is dispatched in one or more containers along one or more information streams. Each actor's or entity's software is a component in DATE. Each actor or entity receives the information that it requires (both data and control) from the CODB along one or more dedicated information streams and send data and control information back to the CODB on the same dedicated information streams. Data is transported on each stream using containers. Each actor component is composed of a framework consisting of a set of components within the framework and two data interfaces (the Physical State Information Interface and Sensor Interface) that handle data management within the actor component.

The highest level framework in DATE supports containers and the Common Object DataBase (CODB) and knits together the DATE components, insures minimal coupling, and insures the efficient transport of information between DATE components and from the virtual environment (VE) or network computing environment to each DATE component. The highest level framework provides the information routing, intelligent agent, and data management services required by the major system components (such as coordinate conversion, data filtering, interest management, actor migration, and data distribution) in a standard manner and also provides effective de-coupling of the components from each other. At the highest level, the framework holds together the major system components and provides a skeleton upon which to assembly computer-generated actors (CGAs) or other entities and to assembly host sensor models. The second level framework is within the CGAs (or the intelligent computing services). The framework at this second level provides a set of services that all entities require (such as data filtering, sensor filtering, entity migration, and data management) and de-couples the individual entity/computing components from each other within the framework and from the remainder of the system. Within the second level, or actor, framework, there are six major components that are interconnected by the framework. The six components are the Physical Representation Component (PRC), the Cognitive Representation Component (CRC), the Skills Component (SC), the Physical State Information Interface (PSII), Sensor Interface (SI) and the Threat Knowledge DataBase.

Within both frameworks in DATE, the components are defined as objects, with the functionality of a component embedded within the single amalgamated object. The frameworks at both levels also contain methods to support entity migration, entity information loggin in XML, data management, initialization, shutdown, GPS satellite based position computation, and entity tracking. Management of data and control information is an important aspect of a framework and a key service for both frameworks. The variables and structures that the frameworks support include: 1) sensor scan pattern management, 2) IADS operation, 3) IADS commands, 4) entity tracking, 5) radar jamming, 6) support for different types of time as specified in the DoD High Level Architecture, 7) firing status, 8) weapons status, 9) chaff, 10) sun position, 11) phenomenology, 12) actor state, and 13) control commands/data. In the frameworks all of this data are accessible by all of the components in the framework, thereby insuring that the component interfaces are plainly defined, easy to implement, simple to maintain, provide access to all available information, and provide low coupling and high information hiding. This set of data supports composition at all levels, provides a common set of services, and supports experimentation with and evolution of components. The combination of frameworks and components insures that modifications to a component do not introduce new variables or data that will affect other components or their interfaces. Because low coupling and high information hiding were important qualities for both the frameworks, in the DATE architecture the components are hidden from each other and the framework has no visibility into the interior operation of any component. The DATE architecture insures that the operations performed upon the data by any component are completely hidden from the framework and from other components.

Figure 2:
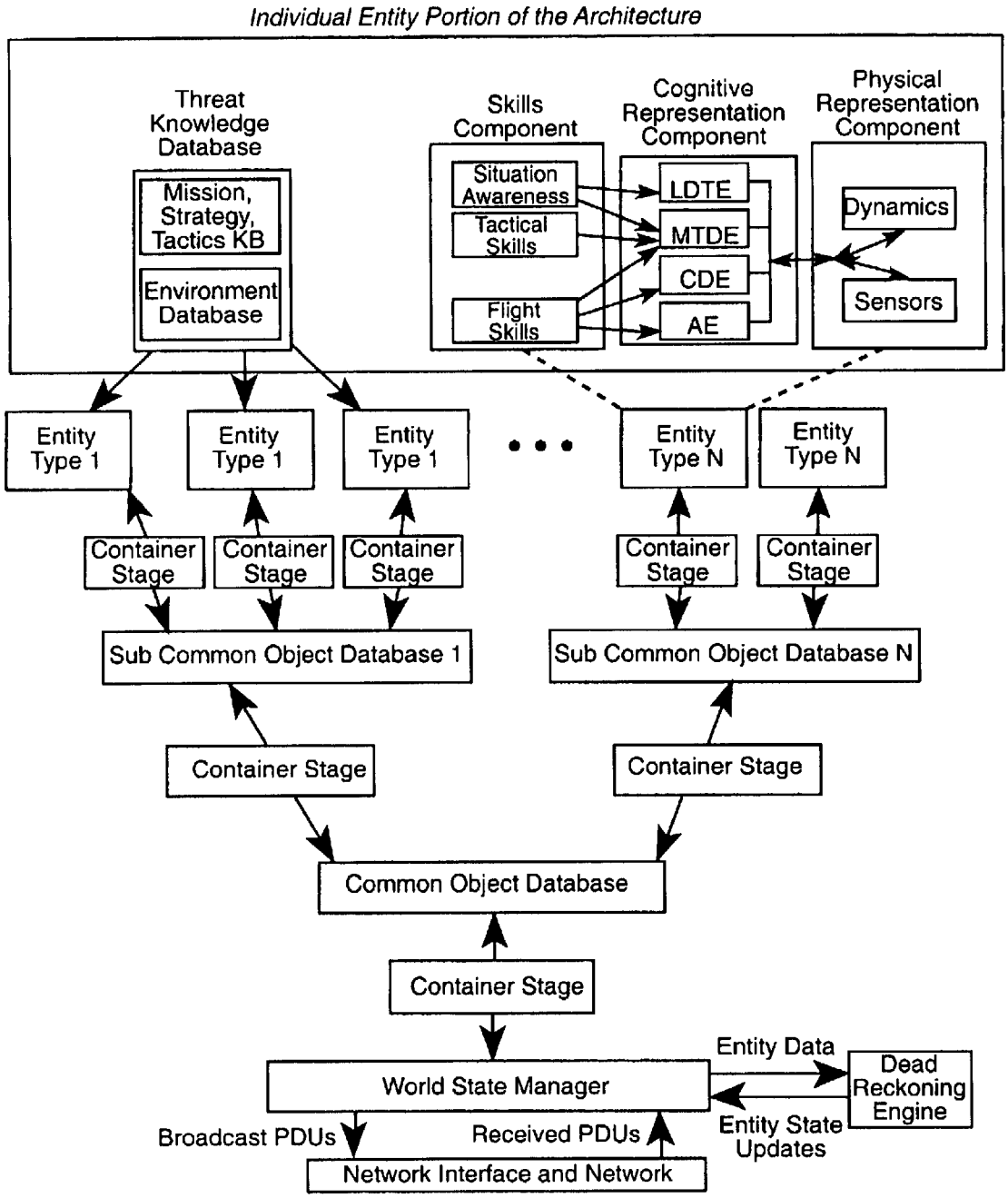
FIG. 2 is a logical view of the Dynamic Adaptive Threat Environment (DATE) Architecture of the present invention.

The logical view of the architecture of the present invention, highlighting its major components, is shown in FIG. 2. In the architecture, the Network Interface and Network component is responsible for the transmission of information between a DATE architecture application instantiation and the other computers that are on the network. The Network Interface also mediates all information assurance and security activities for the architecture, and is responsible for information assurance and security between an executing DATE-based application and the network and other computers on a network.

As data arrives it is forwarded from the Network Interface software to the World State Manager (WSM). The World State Manager maintains the entire state of the activity on the network and of the entities in a distributed computing environment based upon the information it receives via the Network Interface. The Work State Manager takes incoming data and updates the information about all the events in the network and places the information into a container for transmission to the CODB. In addition, the WSM is responsible for all dead reckoning of entity state for all entities in-between receipt of entity state updates for each entity. As a result, when the CODB requests an update from the WSM, (The CODB requests an update after it has serviced each of its information streams with its information.) the WSM has a container with current network state information ready to be dispatched. Once in the CODB, the data is made available to every component via information streams.

As shown in FIG. 2, within each actor/entity framework implementation the architecture specifies six major components that are interconnected by the actor framework. The six components are the Physical Representation Component (PRC), the Cognitive Representation Component (CRP), the Skills Component (SC), the Physical State Information Interface (PSII), Sensor Interface (SI), and the Threat Knowledge DataBase. (The Threat Knowledge Base is a database of information that can be accessed by the Cognitive Representation Component and contains all of the information that the actor needs to reason accurately and in a way that results in the actor exhibiting human-like behaviors.) Actor data processing is modeled in two stages, computations of the physical world state contained with the Physical Representation Component (PRC) and then reasoning upon the state, which occurs in the Cognitive Representation Component (CRC). The resultant reasoning outputs are then used to control the actor and to generate outputs for the network environment.

The Physical Representation Component (PRC) contains the description of the physical attributes and properties of the individual entity or CGA and has three major sub-components, Dynamics, Sensor Interface, and Sensor. The implementation of the PRC component encapsulates one or more physical models for the operation of the entity's dynamics unit or sensor model(s) within a single package for the entity or CGA. Conversely, in DATE each entity or CGA can access one or more dynamics models or sensor models. The PRC's Dynamics sub-component includes the information and models that define entity or actor-specific properties and performance capabilities such as motion, weapons load, damage assessment, and physical status. The Dynamics sub-component component uses the information provided by the CODB via containers to compute the current velocity and orientation of the entity or actor in DATE. The result of the Dynamics component computations are sent to other components of the entity or CGA as well as to the external portions of the distributed simulation environment via the CODB. The output of the Dynamics component is written in XML. The result of the dynamics component computations may also then be sent from the CODB to other software components of the same actor or entity.

The Sensor sub-component contains the sensor model(s) used by the actor/entity. The sensor models determine which entities in the network environment can be sensed. The output of each sensor is written in XML. The other component of the PRC is the Sensor Interface (SI). (The PSII and SI are specialized types of containers.) The Sensor Interface is responsible for extracting incoming information and providing each sensor model with the information that it requires to function. The output of the Sensor Interface is written in XML. The sensor filtered information is then forwarded to the PSII to be used in conjunction with the Knowledge Base by the Decision Engines. The output of the PSII is written in XML.

Within an individual CGA or intelligent service, each CGA or intelligent service accesses a Knowledge Base that was assembled specifically for its type. However, while the knowledge base for a specific type is shared by all of the instantiations of that type, the instantiations are not required to utilize all of the knowledge bases's information. The information in the knowledge bases accessed by each DATE instantiation of an actor is determined by the fidelity level and skill level specified for the instantiation. The Knowledge Base contains all of the knowledge and information related to doctrine, tactics, mission parameters, strategy, and the synthetic environment description. There are two sub-components of the Knowledge Base for each type: the Environment Database and the Mission, Strategy, and Tactics Database. The Environment Database for each type contains the specification of the terrain and other static portions of the network environment in visible wavelengths as well as the wavelengths used by the type's sensors. The Environment Database must be able to be shared, as a result each environment representation has only one instantiation for all of the entity instantiations in a computer host. However, the data provided to a type by a specific environment description is determined by the type. For example, while all actors can potentially share the same terrain database, different types of actors can have access to different aspects of the description based upon the actor type's characteristics. The other sub-component of the Knowledge Base, the Mission, Strategy, and Tactics Database, contains the information about the mission, the tactics for the threat type, and the strategies to be employed by the threat type. The contents of this knowledge base are written in XML.

The decision-making system for the DATE architecture consists of two components as shown in FIG. 2, a Skills Component (SC) and the Cognitive Representation Component (CRC). The SC consists of those factors that vary between individual instantiations within a type. The SC serves to model the skills and ability of the operator of an entity. The output of the Skills Component is written in XML. The CRC contains the intelligent decision-making processes and the knowledge they need. The CRC has four reasoning engines: the Long-term Decision Engine (LTDE), Mid-term Decision Engine (MTDE), the Critical Decision Engine (CDE), and the Arbitration Engine. The first three engines perform long-term, near-term, and immediate reasoning operations for the CGA respectively. Any artificial intelligence approach to decision-making can be used in any of the three engines, the architecture does not impose any limitations. The Arbitration Engine (AE) is a special decision engine used to arbitrate between the other three decision engine outputs and to apply skills and combat psychology parameters to their outputs. The primary function of the AE is to determine which of the other three Decision Engine outputs should be used as the DATE actor's next action. To determine the skill and combat psychology modifiers to apply, the AE accesses information held in the SC. Any artificial intelligence decision-making mechanism can be used in the Arbitration Engine.

Figure 3:
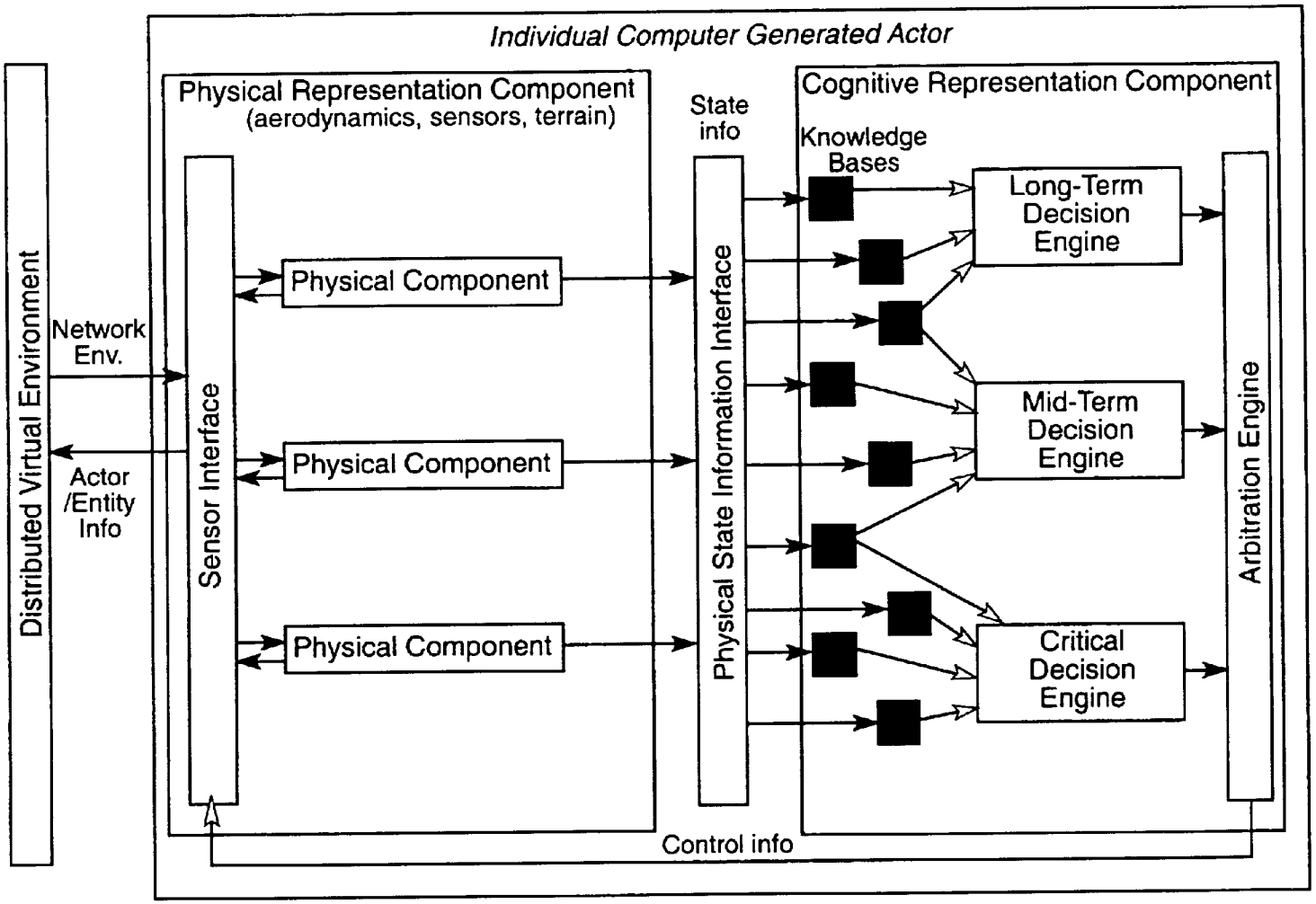
FIG. 3 is a representation of the data flow for a single computer generated actor according to the present invention.

The movement of data through the DATE architecture at the entity/actor framework level is shown in FIG. 3. The Sensor Interface serves as the data warehouse and data router on the information stream to an entity or actor and its Physical Component models. The output of the Physical Component stage (which is the motion and sensor model outputs) is sent to the decision-making component via the Physical State Information Interface (PSII). The PSII stage routes the information from a Physical Component to the decision engines that require the information produced by a particular sensor model. The incoming data is used by the LTDE, MTDE, and CDE in conjunction with the information contained in the knowledge bases to perform their long-range, mid-range and immediate decision making functions. The LTDE, MTDE, and CDE send the outputs of their computations, written in XML, to the Arbitration Engine (AE), which selects the action to be performed and modifies the action according to the actor's skill level, human behavior model, and combat psychology model.

The sensor model(s) for an entity are the first of its components to execute during each of its state update cycles. The dynamics model for an actor is the last of its components to execute during each of its update cycles. We do not assume that an entity state update occurs atomically; the operating system can interrupt an entity's state update cycle at any time. The framework is constructed so that an interruption does not result in errors in the entity's or actor's behavior or performance. Data filtering occurs before the incoming information arrives at an actor's decision engines. Data filtering is performed by the Physical State Information Interface, the Sensor models, and in the Sensor Interface. The Sensor Interface is responsible for routing information to all of the dynamics and sensor models within the Physical Representation Component. (There is only one Sensor Interface for each actor. There is only one Physical State Information Interface for each actor.).

When an actor or entity has computed its new state, this information must be provided to the other entity instantiations in the local DATE application at its host as well as to the other computers in the network. To accomplish this data transfer, the actor or entity places its state information into a container that is dispatched along its outgoing information stream to the CODB for relay to the WSM and to other local DATE objects and components. Once the new entity or actor state data is in the CODB, the entity or actor state data is passed on to the WSM for transmission on the network and is also repackaged into outbound containers by the CODB to the other instantiations in the local DATE application.

The entity and actor components are segregated from the remainder of the DATE architecture and isolated from each other to insure that modifications to them are isolated and will not propagate. For example, the PRC is only responsible for entity maneuvers and for sensing physical world state information, and functions completely unaware of the status of the other components. Control of the PRC for functions such as halting and migration is accomplished using a control container dispatched from the CODB. Likewise, the CRC is solely responsible for decision-making and only knows about the physical component's status based upon the data communicated to it. The Knowledge Base is more closely tied to the CRC than the PRC because the CRC is responsible for computing control outputs for the threat based upon the knowledge available to the simulated operator of the threat.

The CODB is a key component of the architecture. The CODB functions as the central data repository and information router between all of the system components and also serves to insure that all of the information publication and subscription (or transmission and reception) requirements specified for the relevant network environment and local entities are met. The CODB component of the DATE architecture has unique properties and responsibilities and is a first-class software object. The CODB receives all inbound information for all of the data streams in a DATE instantiation, determines the recipients of the data, and stores the information until requested, at which time the information is dispatched in a container on one or more information stream(s). The CODB also contains intelligent agents that are used to check the accuracy of the connections on the information streams, select software gauges to enable for the CODB, evaluate gauge output, initiate and terminate data logging, and to report error conditions (using XML). The CODB contains software gauges to provide data about the information being transmitted, the correctness of the fit of the components, the operation of the system, and other performance and correctness information that would be of use in assembling, debugging, and using the DATE architecture and system. The CODB in conjunction with containerization insures that new capabilities, objects, entities, and actors can be easily added to a DATE-based application as they are needed.

Once the network state information reaches the CODB, the data is repackaged and routed into outgoing containers destined for either individual entities or for a sub-CODB that services a single entity type. (Sub-CODBs are not containers within the CODB, they are separate structures/objects within the architecture.) This repackaging and routing is accomplished by methods in the CODB. At the CODB, repackaging consists of coordinate conversion, filtering, data verification, error checking, translation into the Extensible Markup Language (XML), and routing. The architecture has provision for multiple sub-CODBs that can be used to provide information to a select subset of the entities hosted in a DATE application. These sub-CODBs are shared by their serviced entities on their dedicated information stream and have the same protection mechanisms and containerization associated with them as the main CODB. Once the network state reaches a sub-CODB, the data is dispatched from there to the entities serviced by the sub-CODB. The containers that depart the CODB or a sub-CODB along an information stream for a recipient are customized for the entity(s) on the stream. The containers can hold the network environment information required by the recipient or they hold control information targeted at one or more entities. The CODB, and all of its sub-CODBs, is also used to store and forward state information from entities hosted by a DATE instantiation to the network environment through the WSM. The CODB and WSM components work together to insure that each DATE application instantiation satisfies its data transmission requirements by consolidating the output from the entities and then transmitting data to the rest of the network.

In the DATE architecture, the inbound and outbound information streams for the entities organize the information transportation activities and the services provided by the highest level framework. Within the architecture, all of the information (data and control) required by an entity or actor comes to the entity or actor via its inbound information stream. All of the information (data and control) produce by an entity or actor and destined for the network environment or for another local DATE component departs the entity or actor via its outbound information stream. By using information streams, we minimize the volume of information transported from the CODB to the entities or actors in a DATE instantiation. Information streams simplify the information flows and control flows within the DATE architecture. Information streams also serve to explicitly specify the information and control flows within the DATE architecture. There is generally one information stream for each type of entity within a DATE-architecture application operating on a given computer (or for each type of information source or sink within a computer network). (In a DoD High Level Architecure (HLA) based distributed simulation environment, the information streams can be determined by examining the required Simulation Object Models and Federation Object Model.) There can also be one dedicated information stream used to transport "hard" real-time data from an actor or entity or component to the CODB and a separate dedicated information stream to transport "hard" real-time data from the CODB to any actors or entities or components that require it. Containers on an information stream are double-buffered; that is, there are two containers on each information stream, one for reading and one for writing. These two containers switch roles when the readers complete their read function.

The data on the information streams are transported within containers. The data portion of containers are composed of pallets, which are in turn composed of slots. There is one slot for every entity in the network environment (or for every type of information that might be transmitted between the network and an application) and between the components of a system. The data in the containers is written using the Extensible Markup Language (XML), which insures that any component that is attached to an information stream can access the data in the stream. Container access is simple. An attaching component uses its internal methods to access the container on the stream(s) that service it, retrieve the data in the container in XML format, and then translate the data from that format to whatever internal format(s) that the component may require. The CODB is responsible for translating the data from the format used within the external computer network into the XML format and for placing the resulting data into the proper containers on the information streams that service the recipients of the data. A single piece of data can be placed into more than one information stream at any given time, data recipients determine the content of the streams and the CODB is responsible for servicing the recipients and placing the required data into whichever streams require the data. The methods portion of a container is composed of software routines that provide gauges, handle the movement of the data in the container along the information stream, and insure that the data remain uncorrupted during transmission. The gauges allow a DATE-based application to gauge its own health, assess the acuracy of its performance, assess information accuracy and assurance, enable rapid integration, promote scaleability, insure that components integrate correctly, assess information corruption, and provide a variety of other data concerning the operation of DATE and the accuracy of the data that it is using. The containers also contain intelligent agents that are used to verify the accuracy of connections (at run-time and during assembly), intelligent agents to select the gauges that should be enabled, intelligent agents to evaluate gauge output, and intelligent agents to report error conditions. The output of the agents is written in XML.

The main CODB has six types of inbound containers that come from the WSM: 1) entity, 2) phenomenology, 3) emissions, 4) transient, 5) control, and 6) migration. The information in these six containers comes in from the WSM or in the case of a control container it can also come from a DATE object or component. These six container types perform the following functions. The entity container contains state information for all entities in the network environment. The phenomenology container holds information about all phenomenology in the network environment except for sensor emissioins. For example, weather information is contained in the phenomenology container. The emissions container holds all sensor emission data, such as radar, infrared, sound, etc. This container holds information concerning status (on/off), operational wavelength, orientation, power, etc. for every sensor. All of the sensors modeled in the network environment are represented in this container at all times. Changes to the emissions container are caused primarily by changes in sensor status, the only exception is when a sensor is destroyed at which time its slot is emptied. The transient container holds information about transient events such as missile launchings, weapon firings, or other actions that are known to have a brief existence within the networked environment. The control container holds information concerning filtering or other object control information, like halt, migrate, or resume, that is being passed from one object to another in DATE. The migration container contains information concerning the state of an entity that is either migrating to or from a DATE host. The CODB has five types of outbound containers that carry data to the WSM: 1) entity, 2) phenomenology, 3) emissions, 4) transient and 5) migration. The functionality of the outbound containers mirrors the functionality of the corresponding inbound containers from the WSM. (While there can be a total of 11 container types used by the main CODB, this is a maximum number as some types may not be needed in a given scenario.) Because all reader side components share the same copy of the distributed virtual environment's state, we insure that they access a consistent description of the world. When a reader finished with a container, the reader switches to a newly filled container of data provided by a writer, such as the WSM, once the writer signals that the new container of data is ready. Each container has only one slot for the data for each of its entities. Therefore, if new information for an entity arrives before the previous information has been accessed by any recipient in the next stage of the information stream, previous data in the slot is overwritten. Within the architecture, data logging can be performed at the CODB or selectively at any of the containers on an information stream. Logging can be enabled via a control container or can be triggered by an intelligent agent operating within the CODB or in a container. Data logging outputs are written in XML.

All containers use a semaphore to signal availability to be written by its data source. No container can ever be read and written at the same time. If a container is being written, readers must use the other container in the pair for data. While one container is being read, the other container is written. If several recipients access the same container, then a semaphore-protected counter is used in the container to indicate the number of readers remaining to be serviced by the current container. When the counter reaches zero, then the reader that set the counter to zero also sets the semaphore to tell the up-stream writer that a new container of data is needed. For each inbound container on an information stream, the CODB has a container-specific method to read the data and transfer/route the data into the appropriate outbound containers. The outbound container from the CODB on an information stream contains the union of all the data required by every entity on the stream. When an entity or actor must transmit data to the network environment, the entity or actor also uses a container to transmit the data to the CODB. Depending upon the number of entities on the information stream, an outbound container can have one or several entities assigned to it. If an outbound container is shared among several entities, then each entity has an assigned slot for its data. Once the container is ready to be dispatched, the last writing entity signals the container and the container moves outbound on the information stream. The set of outbound containers from the CODB to the WSM contains only the data required by the other participants in the networked environment. The set of inbound containers from the WSM to the CODB contains all of the information required by each active entity for the local DATE application. If the CODB is the recipient of data, it is the only recipient of the data in the container on that information strema. The CODB is responsible for dispersing the data from its inbound containers to all of the outbound containers since multiple information streams must fan out from this one data source. Fan-out occurs a result of the operation of the methods for a CODB on the contents of inbound containers on the information stream.

Figure 4:
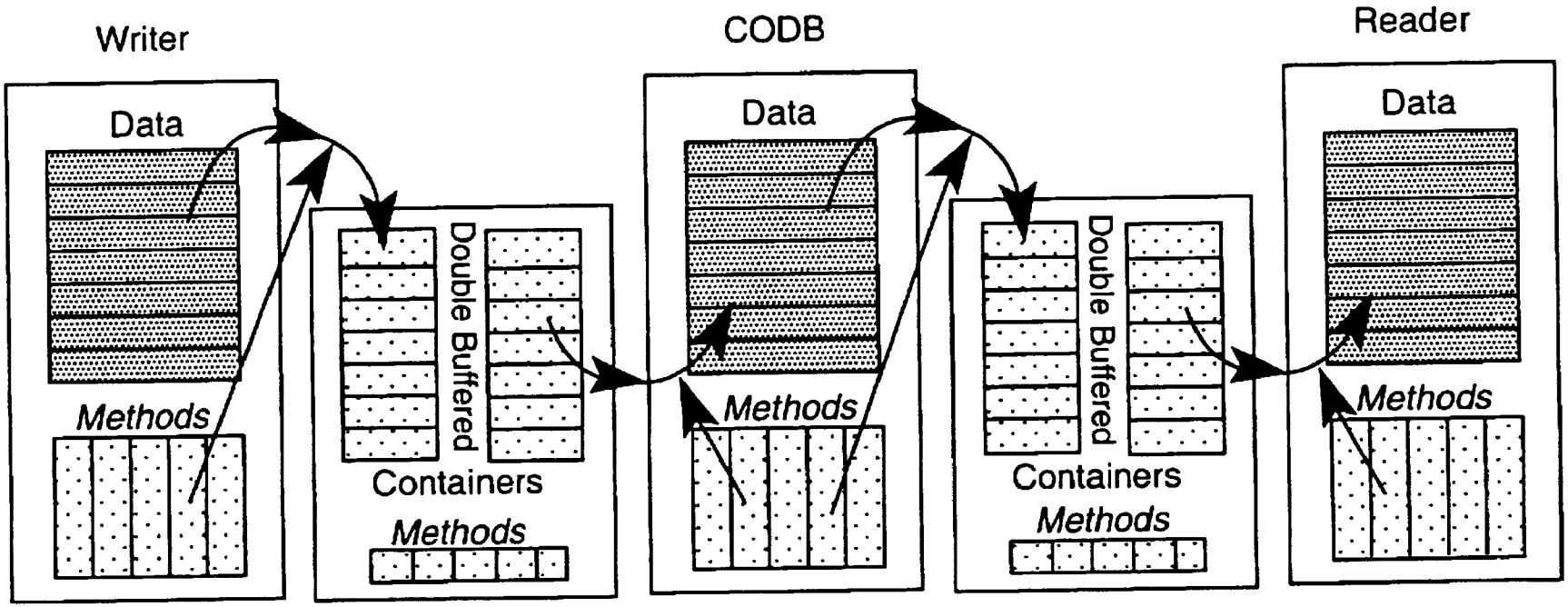
FIG. 4 is a detailed view of the data movement from a writer to a reader in according to the present invention.

Given the importance of the container approach to the architecture, we will provide an example of the flow of data along one information stream, as shown in FIG. 4. In FIG. 4, the writer can be any source of data; likewise, the reader can be any destination for data. The CODB in the figure can be the main CODB in the architecture or any sub-CODB. The sources of data as well as the destinations have their own public and private data structures and methods. As shown, data moves along an information stream from stage to stage. At each stage, methods access the stream to read and write to the stream. In an information stream, the reader's sole responsibility is to read data from a container and operate upon it; the writer's sole responsibility is to write data to a container. The container is responsible for providing software gauges and for insuring data integrity. As shown in the figure, the data stored within a stage's data structures are local and optimal for the stage and destination. The methods at each stage have two responsibilities toward the information flow. The first responsibility is to retrieve information from the inbound container, place it into the format required by its stage, and insert it into the appropriate slot in the stage's data area. The second responsibility is to place the data in the local data area into all of the outbound containers that require the data, which may require that the method copy the information into a number of different containers on different information streams. Copy actions occur asynchronously.

All public data for a DATE application object or component moves through and is routed by the CODB. All data moves between major DATE system objects in containers. Therefore, an object or component exports its data to the CODB via a container, and from there the CODB uses one or more containers to transmit the data to the data recipient (s). The CODB/container combination is used to insure low coupling between DATE application objects. The paths followed by data and control information between objects and components define the information streams in DATE. Each information stream between system objects is served by a set of containers. Each information stream has a set of incoming containers and a set of outgoing containers. The incoming and outgoing containers in each information stream are available in a double-buffering scheme. Access to data in a container is atomic at the container level; that is, the recipient retrieves all of its data from the container in one access activity.

The CODB has the sole responsibility for providing information to an entity in the XML language and in the format expected by the entities on the information stream. For example, the CODB holds the methods that perform coordinate conversion. Upon receipt of data in an inbound container, the CODB converts the data into XML for the objects that receive the data. The CODB has this responsibility so that the recipient objects or components can remain unaware of all other DATE components, all the recipient object needs to know is where its data lies in its serving container. The recipient object does not need to contain software methods for translating from or to external coordinate systems or methods. The data recipient must perform format conversion from XML to its own internal format. As a result, changes to an object do not affect any other objects in DATE except for the CODB or sub-CODB(s) that are upstream from the changed object. For example, the SI routes entity location and characteristics information, the phenomenoogy information for entity location, and the information concerning location & orientation to the sensor model(s) so that they can compute the entities that are visible. The information output from the sensors is then transported to the actor's decision-making component (the Cognitive Representation Component) for decision-making.

Whenever a new entity appears in the networked environment the CODB is informed of this event by the WSM via a message from the WSM that is placed in a control container. When the CODB is informed of the new entity, the WSM must supply the entity state, including ID, alliance, type, class, and location, at a minimum in addition to the container that the new entity will be assigned to, its pallet, and its slot. Finally, the CODB determines which of its outbound containers require information about this new entity and then makes the appropriate container assignments and instantiates a new container if it is required. When an entity is removed from the environment, the WSM informs the CODB of this event. The CODB then destroys any containers occupied only by this entity and informs the entities served by any affected containers that the entity was removed.

Figure 5:
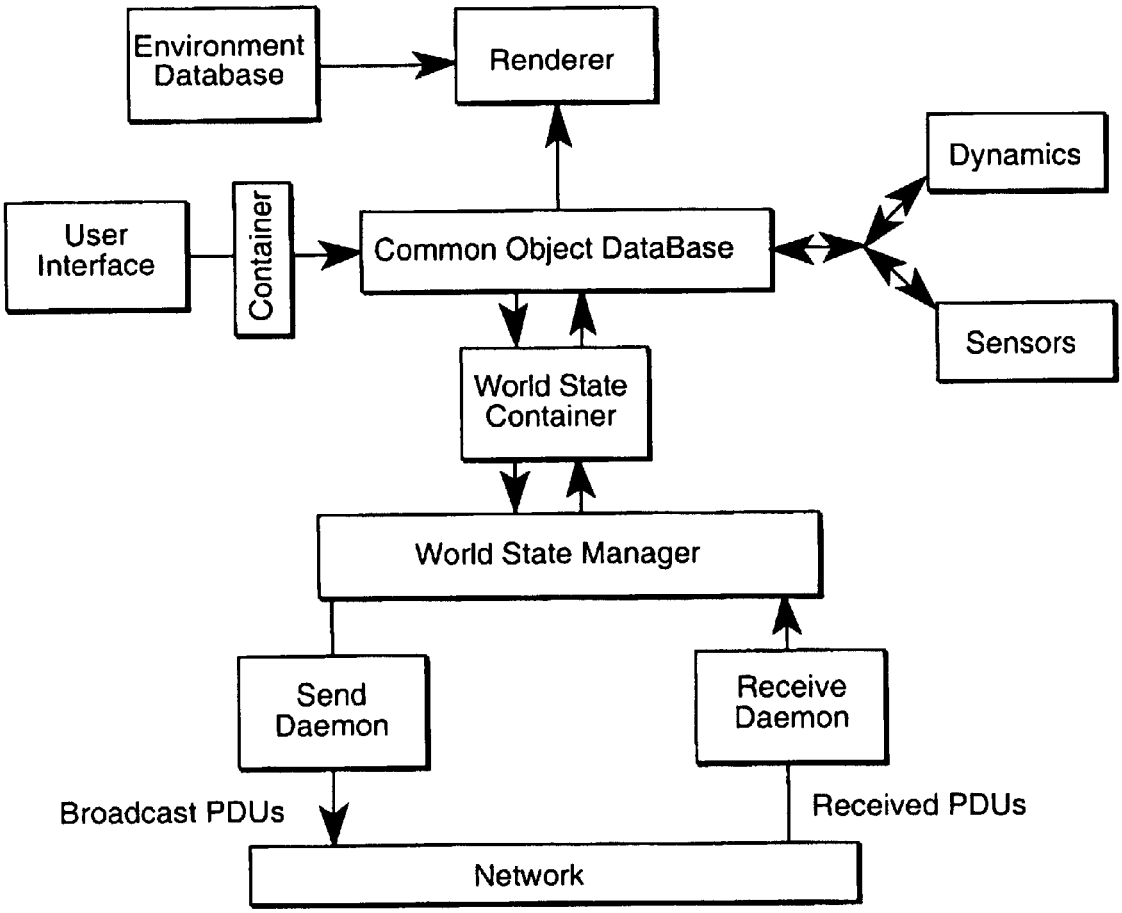
FIG. 5 is the DATE Architecture Used for Manned Virtual Environment Systems.

In an alternative to the present invention as shown in FIG. 5, the DATE architecture can also be used to support manned virtual environment systems. As shown, the alternative uses virtual environment phenomenology servers (including weather, radar transmission, and infrared transmission) through environment databases. This information is based through to the system through a renderer. Then, it is passed on through the WSM to the network. The CODB is used as the interface to the user and various sensors and dynamics models that may be needed for the system. This alternative can also be used for several other applications such as: distributed intelligent tutoring servies; single-computer host intelligent tutoring services; intelligent education services, including individualized-student instruction; and a basis for a common development environment for human behavior model development, evaluation, experimentation, and execution.

Given the above, those skilled in the art will appreciate thayt the present invention provides several advantages over the prior. These include that it:

Uses information streams to move data between components;

Uses software frameworks to support the information streams and components;

Uses containers to move data along information streams. Containers hold data formatted using the Extensible Markup Language (XML) and methods for delivering data to components at the end of a stream and for receiving data at the start of the stream;

Uses pallets within containers to structure the data by major type;

Uses slots within pallets within containers to order data by minor type;

Uses software gauges within the information streams and containers to provide data about the information being transmitted, the correctness of the fit of the components, the operation of the system, and other performance and correctness information that would be of use in assembling, debugging, and using the system;

Supports rapid experimental and exploratory prototyping;

Supports the operation of computer models of human behavior, human decision making, sensors, weather, terrain, or any other type of computer model within a distributed simulation environment or within a distributed virtual environment;

Uses containers to minimize the computational and bandwidth cost of transmitting data within a software application on one or several computer systems;

Uses the concept of information streams to aggregate inbound and outbound information flows;

Supports assembly of complex systems through composition of software using components and software objects;

Supports/exploits software component technology;

Support/incorporates the use of software gauges for determining data transfer accuracy, component interconnection faults, data type accuracy, data transfer timing, actor migration timing, and data transport volume measurements;

Performs data logging at the central data run-time repository, the Common Object DataBase, or at any of the containers (Logging output is written in XML.);

Supports the use of gauges to enable deep inspection of the run-time performance of an entire system or for select components of a system (Gauge output written in XML.);

Support software module plug-ins at both compile-time and run-time and during simulation execution.

Enables the concurrent execution, inspection, and comparison of any of the models used in a DATE application;

Supports the use of any decision mechanism for the computer-generated actors or other decision-making.

Supports the use of skill, fatigue, emotion or other components of human behavior within a human behavior model;

Supports the incremental growth, development, and refinement of knowledge bases and human behavior models.

Supports actor and knowledge base migration at run-time and during simulation execution;

Support multiple levels of fidelity for sensor models and 3-dimensional terrain models;

Uses intelligent software agents to verify the correct operation of connections at the major seams in the system, to select gauges to use, and to evaluate and report on error conditions;

Supports satisfying requirements for hard real-time transmission of sensor signals;

Supports satisfying requirements for hard real-time transmission of actor behaviors;

Provides a foundation for the incremental growth of a software system as requirements and the design evolve;

Permits software components and software objects to be independently developed and integrated without disturbing or distressing existing software for a computer-generated actor application;

Supports the use of software gauges on the information streams and in the containers;

Shares knowledge bases such that the difficult and expensive knowledge base construction process must only be accomplished once;

Achieves different levels of fidelity and skill are achieved within the decision mechanisms and its use of the knowledge bases instead of being hard-wired into the decision mechanisms or the knowledge bases;

Encourages experimentation and composition at the software component, framework, and the architectural levels;

Inherently supports the use of multiprocessing, distributed processing, and multi-threaded computation.

Support multiprocessing and the distribution of the resources required for effective execution of large, complex, distributed virtual environments or simulation environments;

Combats software entropy and minimizes coupling between system components and objects;

Guarantees the isolation of reasoning components from knowledge base components and permits multiple threats to be instantiated within a single DATE system;

Supports data fidelity by restricting the information available to an entity; generally the restriction mirrors the information available to the corresponding entity in the real-world;

Allows a single DATE system (or computer) to insert multiple threats or many different types into a DVE;

Allows the ready incorporation of a wide variety of reasoning systems, sensor models, and other capabilities;

Enables low-cost software maintenance; and

Supports rapid switching between components with minimal impact to performance or operation.

It is understood that certain modifications to the invention as described may be made, as might occur to one with skill in the field of the invention, within the scope of the appended claims.

What is claimed is:

1. A data-handling, software architecture enabling new components and software objects to be added and interchanged without forcing the modification of or otherwise disturbing existing software comprising:

information streams for receiving and transmitting data;

state-changing computer model components for receiving, processing and transmitting incoming data from said information streams;

unvarying, during execution, software object containers including data structure and software methods for managing data and wherein source of incoming data determines container selection and wherein only one container selection is available for each of said components;

a first framework at a highest level of said data-handling software architecture providing minimal coupling of said components and data routing and data management services including efficient data transport between said components and between said components and a virtual environment coupled to a network via a World State Manager;

a second framework supporting said state-changing computer model components by providing a set of services required for specific component applications and decoupling individual components from each other and said architecture;

intelligent computer services within said second framework comprising:

a physical representation component;

a cognitive representation component;

a skills component;

a physical state information interface;

a sensor interface, and a knowledge database;

said first and second framework invisible in the interior operation of any component of said state-changing computer model components; and a Common Object Database functioning as a central data repository and information router between all of said state-changing computer model components and wherein data moves between said state-changing computer model components, responsive to information from said intelligent computing services, after passing through said Common Object Database through said software object containers along said information streams.

2. The data-handling software architecture of claim 1 wherein said state-changing computer model components comprise a computer model of a defense vehicle.

3. The data handling software architecture of claim 1 wherein said state-changing computer model components further comprise an intelligence actor in said component.

4. The data-handling software architecture of claim 1 wherein said Common Object Database comprises:

intelligence agents used to check accuracy of connections in an information stream; and software gauges selected by said Common Object Database providing data about transmitted information and component fit.

5. The data-handling software architecture of claim 1 wherein said Common Object Database comprises:

means for receiving inbound information for all servicing data streams;

means for determining data recipients; and means for storing information until requested.

6. The data-handling software architecture of claim 1 wherein said unvarying, during execution, software object containers further comprise:

hierarchically nested pallets comprising a major category of information or data in a container; and slots within said pallets wherein all information related to a specific component is placed into only one slot within a container.

7. The data-handling software architecture of claim 1 wherein said first framework further comprises:

means for coordinate conversion; and means for data filtering.

8. The data-handling software architecture of claim 1 wherein said first framework further comprises:

means for holding together major system components; and a skeleton upon which to assemble computer-generated actors to assemble host sensor models.

9. The data-handling software architecture of claim 1 wherein said first and second frameworks further comprise means to support component migration;

component information logging in Extensible Markup Language;

means for data management;

means for initialization;

means for shut down;

means for GPS satellite based position computation; and means for entity tracking.

10. The data-handling software architecture of claim 1 wherein said knowledge database further comprises:

an environment database; and a mission, tactics and strategy database.

11. A data-handling software design enabling adding and interchanging of new components and objects without disturbing existing software comprising the steps of:

receiving and transmitting data using information streams;

receiving, processing and transmitting incoming data from said information streams using state-changing computer model components;

managing data using unvarying, during execution, software object containers wherein source of incoming data determines container selection and wherein only one container selection is available for each of said components;

data routing with minimal coupling of said components and data managing services using a first framework at the highest level of said data-handling software design including efficient data transport between said components and a virtual environment and a network coupling environment;

supporting said state-changing computer model components using a second framework by providing a set of services required for specific component applications and decoupling individual components from each other and said architecture;

providing intelligent computing services within said second framework comprising the steps of:
physical representation computing;
cognitive computing;
skills computing;
interfacing based on physical state information;
sensor interfacing, and
providing a knowledge database;

said data routing and supporting steps invisible in the interior operation of any component of said state-changing computer model components; and providing a Common Object Database functioning as a central data repository and information router between all components and wherein data moves between said state-changing computer model components, responding to said intelligent computing services, after passing through said Common Object Database through said software object containers along said information streams.

12. The data-handling software design of claim 11 wherein said receiving, processing and transmitting step further comprises the step of receiving, processing and transmitting incoming defense vehicle data from said information streams using state-changing defense vehicle computer model components.

13. The data handling software design of claim 11 wherein said receiving, processing and transmitting step further comprises the step of receiving, processing and transmitting incoming defense vehicle data from said information streams using state-changing defense vehicle computer model components containing an intelligence actor.

14. The data-handling software design of claim 11 wherein said step of providing a Common Object Database further comprises the steps of:

determining accuracy of connections in an information stream using intelligence agents; and providing data about transmitted information and component fit using software gauges selected by said Common Object Database.

15. The data-handling software design of claim 11 wherein said step of providing a Common Object Database comprises the additional steps of:

receiving inbound information for all servicing data streams;

determining data recipients; and storing information until requested.

16. The data-handling software design of claim 11 wherein said step of managing data using unvarying, during execution, software object containers wherein source of incoming data determines container selection and wherein only one container selection is available for each of said components further comprises the steps of:

providing hierarchically nested pallets comprising a major category of information or data in a container; and providing slots within said pallets wherein all information related to a specific component is placed into only one slot within a container.

17. The data-handling software design of claim 11 wherein said data routing step further comprises the steps of:

providing coordinate conversion; and filtering data.

18. The data-handling software design of claim 11 wherein said data routing step further comprises the steps of:

holding together major system components; and providing a skeleton upon which to assemble computer-generated actors to assemble host sensor models.

19. The data-handling software design of claim 11 wherein said data routing step and said supporting step further comprise the steps of:

supporting component migration;

providing component information logging in Extensible Markup Language;

managing data;

initializing;

shutting down;

computating GPS satellite position; and tracking components.

20. The data-handling software design of claim 11 wherein said step of providing a knowledge database further comprises the steps of:

providing an environment database; and providing a mission, tactics and strategy database.

* * * * *